2 Sheets—Sheet 1.

O. PICKERING.
BUSH-CUTTING IMPLEMENT.

No. 177,554. Patented May 16, 1876.

WITNESSES:
E. Wolff
John Goethals

INVENTOR:
O. Pickering
BY
ATTORNEYS.

2 Sheets—Sheet 2.

O. PICKERING.
BUSH-CUTTING IMPLEMENT.

No. 177,554. Patented May 16, 1876.

WITNESSES:
E. Wolff.
John Goethals

INVENTOR:
O. Pickering
BY
ATTORNEYS.

UNITED STATES PATENT OFFICE.

OLIVER PICKERING, OF NEEDHAM, MASSACHUSETTS.

IMPROVEMENT IN BUSH-CUTTING IMPLEMENTS.

Specification forming part of Letters Patent No. 177,554, dated May 16, 1876; application filed April 4, 1876.

*To all whom it may concern:*

Figure 1:
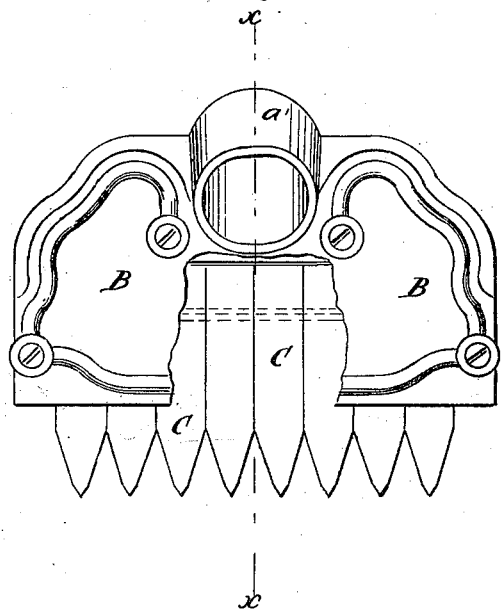
Figure 2:
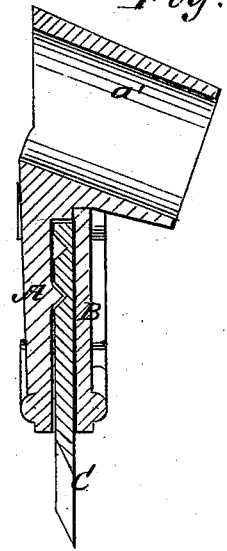
Figure 3:
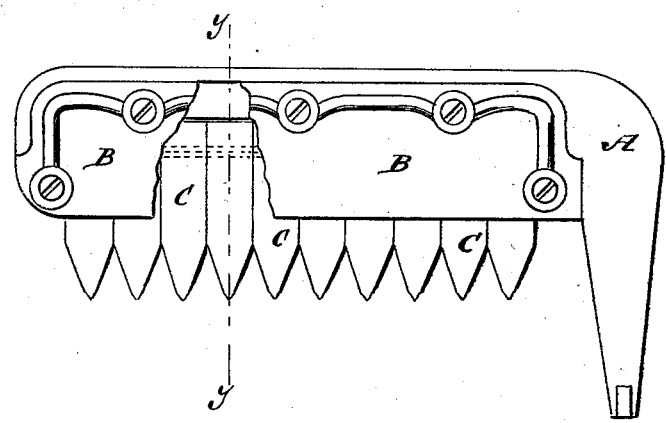
Figure 4:
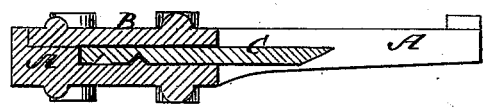

Be it known that I, OLIVER PICKERING, of Needham, in the county of Norfolk and State of Massachusetts, have invented a new and useful Improvement in Bush-Cutting Implements, of which the following is a specification:

Figure 1, Sheet 1, is a face view of my improved implement, part of the face-plate being broken away to show the construction. Fig. 2, Sheet 1, is a detail section of the same, taken through the line $x\ x$, Fig. 1. Fig. 3, Sheet 2, is a face view of the same arranged for use as a scythe, part of the face-plate being broken away to show the construction. Fig. 4, Sheet 2, is a detail section of the same, taken through the line $y\ y$, Fig. 3.

Similar letters of reference indicate corresponding parts.

The object of this invention is to furnish an improved implement for cutting bushes, which shall be so constructed that it will not slip over the bushes without cutting them, which may be used as a hoe or as a scythe, as may be desired, and which will allow the knives to be readily removed and sharpened, when required.

The invention consists in an improved bush-cutting implement formed of the recessed and flanged back plate made with a V-shaped rib upon the bottom of its recess, the face-plate and the cutters made with V-shaped forward ends, and with V-shaped cross-grooves upon their rear sides, and whether the handle be attached at its rear edge or at one end, as hereinafter fully described.

A is the back plate, in the face of which is formed a recess to receive the cutters or knives C, where they are secured in place by the face-plate B. The rear and side edges of the face-plate B rest and fit against a flange formed around the rear and side edges of the plate A, to keep the said plate in place and relieve the bolts from having to sustain any side strain. The side edges of the cutters C rest against each other, and in their rear sides are formed one, two, or more V-shaped cross-grooves to fit upon a V-shaped rib formed upon the plate A, in the bottom of its recess, to prevent the cutters C from dropping out or being pulled out. The forward ends of the cutters C are made V-shaped, and are beveled upon their lower sides.

The cutters C can be readily removed and sharpened when dull, and can be moved forward when worn; but in this case a bar or plate of the proper width should be interposed between their rear ends and the rear side of the recess in the plate A. With this construction, the cutters C cannot slip over the bushes with which they come in contact, but must cut them off.

The implement may be made with an eye or tang upon the middle part of its rear edge, to receive a handle like a hoe, as shown in Figs. 1 and 2; or it may have a tang at one end to receive a handle like a scythe, as shown in Figs. 3 and 4, according to the way in which it is desired to use it, the operating parts being the same in either case, except that when used as a scythe it may be made longer.

Having thus described my invention, what I claim as new, and desire to secure by Letters Patent, is—

An improved bush-cutting implement formed of the recessed and flanged back plate A, made with a V-rib in the bottom of its recess, the face-plate B, and the cutters C, made with V-shaped forward ends and V-shaped cross-grooves upon their rear sides, substantially as herein shown and described.

OLIVER PICKERING.

Witnesses:
THOMAS W. PAGE,
SARAH J. PICKERING.